(12) United States Patent
French et al.

(10) Patent No.: US 8,825,931 B2
(45) Date of Patent: Sep. 2, 2014

(54) KVM SWITCH SYSTEM CAPABLE OF WIRELESSLY TRANSMITTING KEYBOARD-MOUSE-DATA BETWEEN WIRED INPUT/OUTPUT DEVICES BASED ON A SECURITY CLEARANCE LEVEL

(75) Inventors: David French, Corinth, TX (US); Kenneth D. Maness, Round Rock, TX (US); Victor R. Villarreal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 13/289,876

(22) Filed: Nov. 4, 2011

(65) Prior Publication Data

US 2013/0117479 A1  May 9, 2013

(51) Int. Cl.
  *G06F 3/023* (2006.01)
(52) U.S. Cl.
  USPC .......... 710/73; 710/62; 710/72; 710/74; 345/168; 345/555
(58) Field of Classification Search
  USPC ...................................... 710/72–74
  See application file for complete search history.

(56) References Cited

U.S. PATENT DOCUMENTS

| | | | |
|---|---|---|---|
| 5,880,721 A | 3/1999 | Yen | |
| 7,136,946 B2* | 11/2006 | Shirley | 710/62 |
| 7,428,606 B2 | 9/2008 | Liu et al. | |
| 7,496,697 B2* | 2/2009 | Sween et al. | 710/38 |
| 7,587,534 B2* | 9/2009 | Liu et al. | 710/62 |
| 7,680,089 B2* | 3/2010 | Wu et al. | 370/338 |
| 7,895,647 B2 | 2/2011 | Sun | |
| 8,149,108 B2* | 4/2012 | Hamel et al. | 340/539.1 |
| 8,558,795 B2* | 10/2013 | Hoerl | 345/168 |
| 8,671,235 B2* | 3/2014 | Tung et al. | 710/62 |
| 8,682,262 B2* | 3/2014 | Austin et al. | 455/91 |
| 2005/0027890 A1 | 2/2005 | Nelson et al. | |
| 2006/0064509 A1 | 3/2006 | Chen | |
| 2008/0036741 A1 | 2/2008 | Hsieh et al. | |

(Continued)

FOREIGN PATENT DOCUMENTS

| | | |
|---|---|---|
| EP | 1075142 A3 | 6/2004 |
| WO | 2006053226 A3 | 5/2006 |

OTHER PUBLICATIONS

Combined Search and Examination Report from corresponding Application No. GB1219494.0 dated Apr. 18, 2013 (8 pages).

(Continued)

*Primary Examiner* — Tammara Peyton
(74) *Attorney, Agent, or Firm* — Shumaker & Sieffert, P.A.

(57) ABSTRACT

There is set forth herein a computer program product, device, and method. In an example method, at least one of one or more processors of a device including one or more wired connectors and a wireless communication device receive a video output from a computing device via at least one of one or more wired connectors. At least one of the one or more processors send the video output to a wireless-enabled device via the wireless communication device using a wireless communication protocol. At least one of the one or more processors receive a keyboard or mouse input from the wireless-enabled device via the wireless communication device using the wireless communication protocol. At least one of the one or more processors send the keyboard or mouse input to the computing device via at least one of the one or more wired connectors.

23 Claims, 5 Drawing Sheets

(56) References Cited

U.S. PATENT DOCUMENTS

| | | |
|---|---|---|
| 2009/0210608 A1 | 8/2009 | Chang et al. |
| 2010/0332580 A1* | 12/2010 | Hoerl et al. ............... 709/201 |
| 2011/0026605 A1 | 2/2011 | Costa |
| 2011/0063211 A1* | 3/2011 | Hoerl et al. ............... 345/157 |
| 2011/0113166 A1 | 5/2011 | Hung et al. |

OTHER PUBLICATIONS

"VNC Viewer for iOS", available at http://www.realvnc.com/products/ios/index.html (accessed Jul. 29, 2011), RealVNC Limited, 2011, pp. 2.

* cited by examiner

KVM SWITCH SYSTEM CAPABLE OF WIRELESSLY TRANSMITTING KEYBOARD-MOUSE-DATA BETWEEN WIRED INPUT/OUTPUT DEVICES BASED ON A SECURITY CLEARANCE LEVEL

TECHNICAL FIELD

The disclosure relates to accessing computing devices, and more particularly, to providing wireless user input/output to computing devices.

BACKGROUND

Typically, a data center environment contains a large number of servers. Although the servers typically have a network connection, a data center technician may sometimes desire to physically access a particular server, such as to power the server down and perform maintenance on it before powering it up again. Server racks with live servers typically do not have a physical keyboard and monitor attached to each server. A Keyboard, Video, and Mouse device, i.e., a KVM device, may provide user access to any of multiple servers from a single console. A KVM device may be connected to a KVM switch that may have eight, sixteen, or some other number of connections, each to an individual server.

SUMMARY

In one example, a computer program product includes one or more computer-readable tangible storage devices. The computer program product further includes program instructions, stored on at least one of the one or more computer-readable tangible storage devices, to receive a video output from a computing device via at least one of one or more wired connectors. The computer program product further includes program instructions, stored on at least one of the one or more computer-readable tangible storage devices, to send the video output to a wireless-enabled device via a wireless communication device using a wireless communication protocol. The computer program product further includes program instructions, stored on at least one of the one or more computer-readable tangible storage devices, to receive a keyboard or mouse input from the wireless-enabled device via the wireless communication device using the wireless communication protocol. The computer program product further includes program instructions, stored on at least one of the one or more computer-readable tangible storage devices, to send the keyboard or mouse input to the computing device via at least one of the one or more wired connectors.

In another example, a device includes one or more wired connectors, a wireless communication device, one or more processors, one or more computer-readable tangible storage devices, and one or more computer-readable memories. The device further includes program instructions, stored on at least one of the one or more computer-readable tangible storage devices for execution by at least one of the one or more processors via at least one of the one or more computer-readable memories, to receive a video output from a computing device via at least one of the one or more wired connectors. The device further includes program instructions, stored on at least one of the one or more computer-readable tangible storage devices for execution by at least one of the one or more processors via at least one of the one or more computer-readable memories, to send the video output to a wireless-enabled device via the wireless communication device using a wireless communication protocol. The device further includes program instructions, stored on at least one of the one or more computer-readable tangible storage devices for execution by at least one of the one or more processors via at least one of the one or more computer-readable memories, to receive a keyboard or mouse input from the wireless-enabled device via the wireless communication device using the wireless communication protocol. The device further includes program instructions, stored on at least one of the one or more computer-readable tangible storage devices for execution by at least one of the one or more processors via at least one of the one or more computer-readable memories, to send the keyboard or mouse input to the computing device via at least one of the one or more wired connectors.

In another example, a method includes at least one of one or more processors of a device comprising one or more wired connectors and a wireless communication device receiving a video output from a computing device via at least one of one or more wired connectors. The method further includes at least one of the one or more processors sending the video output to a wireless-enabled device via the wireless communication device using a wireless communication protocol. The method further includes at least one of the one or more processors receiving a keyboard or mouse input from the wireless-enabled device via the wireless communication device using the wireless communication protocol. The method further includes at least one of the one or more processors sending the keyboard or mouse input to the computing device via at least one of the one or more wired connectors.

The details of one or more embodiments are set forth in the accompanying drawings and the description below. Other features, objects, and advantages will be apparent from the description and drawings, and from the claims.

DETAILED DESCRIPTION

There is set forth herein a method, device, and program product for use in providing wireless user input/output (I/O) to target computing devices, such as servers. Various embodiments disclosed herein may enable a user to access and interface with any of a large number of servers from a mobile device, among various other advantages.

Figure 1:
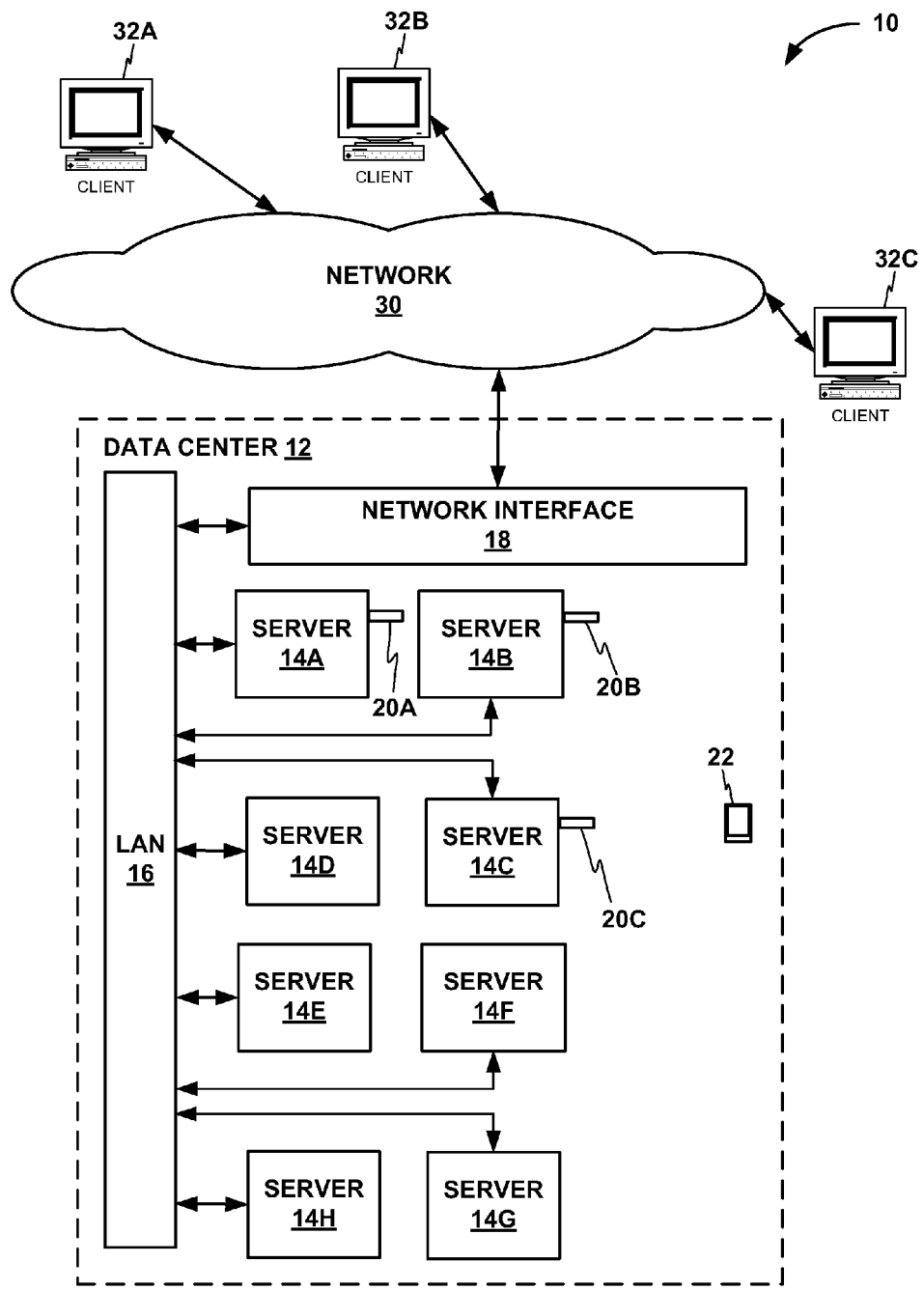
FIG. 1 is a block diagram of a data center in which wireless user input/output (I/O) is provided to one or more computing devices, according to an illustrative example.

FIG. 1 is a block diagram of a data center in which wireless user I/O is provided to one or more computing devices, according to an illustrative example. FIG. 1 merely depicts one example and is not intended to assert or imply any limitation with regard to the environments in which different embodiments may be implemented; many modifications to the depicted environments may be made. Computing environment 10 includes data center 12. Data center 12 may be a specialized facility that houses one or computing devices, illustratively represented by servers 14A-14H. While a certain number of servers 14A-14H are shown in the block diagram of FIG. 1, data center 12 may host any number of servers, network appliances, workstations, data storage assets, or other resources, in various examples. The one or more computing devices of data center 12, such as servers 14A-14H, may be physically collocated, or may be physically spread out among various different locations. Servers 14A-14H may be rack-mounted or stand-alone servers, and may be connected to uninterruptible power supplies (UPSs). Data center 12 may host or provide any type of data services for an enterprise or for subscribers. Data center 12 may be operated by one enterprise for providing its own services, or may be operated by a data services specialist that provides managed data services for other subscribers that sign on for such services.

Servers 14A-14H are connected to each other and to network interface 18 through LAN 16 in this example. LAN 16 is a secure high speed local area network within data center 12. One or more of servers 14 or other resources of data center 12 may also have other types of communicative connections such as Ethernet, Gigabit Ethernet, fiber optic cables, or switching fabric, for example. Servers 14A-14H are also connected to network 30, such as the Internet, through LAN 16 and network interface 18, in this example. Network 30 may also be an enterprise intranet, a local area network (LAN), or a wide area network (WAN) in other examples. FIG. 1 is intended as an example, and not as an architectural limitation for the different illustrative embodiments.

Servers 14A-14H and any other resources of data center 12 may exchange data, through network interface 18 and network 30, with external assets, illustratively represented by client computers 32A-32C. Each of servers 14A-14H may communicate data through data packets carried over network 30 using protocols or protocol stacks such as the Transmission Control Protocol/Internet Protocol (TCP/IP) protocol stack. Servers 14A-14H may run any type of applications, such as web server software, for example. Servers 14A-14H may generate, process, or communicate any type of data, such as application data, boot files, or operating system images, to client computers 32A-32C. Client computers 32A-32C may be, for example, personal desktop computers, workstations, laptops, tablets, smartphones, feature phones, or any other type of computing device.

A number of mobile KVM devices 20A-20C (i.e., mobile KVM devices 20) have also been introduced into data center 12, as well as a mobile KVM-enabled wireless device 22. A "mobile KVM device" is short for a mobile keyboard-video-mouse device. Mobile KVM devices 20A-20C wirelessly transmit user I/O data, such as one or more of keyboard, video, and mouse data, between servers 14A-14C, respectively, and mobile KVM-enabled wireless device 22, such as a smartphone, that runs a mobile KVM application (i.e., app). Wireless user I/O may include video output from a target computing device, such as one of servers 14A-14H, that is delivered, via one of mobile KVM devices 20A-20C, to mobile KVM-enabled wireless device 22. Wireless user I/O may also include keyboard and/or mouse input from mobile KVM-enabled wireless device 22 that is delivered, via one of mobile KVM devices 20A-20C, to a target computing device. The mobile KVM app is an example of a wireless user I/O application that enables mobile KVM-enabled wireless device 22 to communicate wirelessly with mobile KVM devices 20A-20C or other computing assets to which mobile KVM devices 20A-20C are connected. The mobile KVM-enabled wireless device 22 running the mobile KVM app therefore enables a user to engage in remote user I/O with servers 14A-14C having respective mobile KVM devices 20A-20C within wireless transmission range of mobile KVM-enabled wireless device 22.

Data center 12 of FIG. 1 is only one illustrative example of a context in which a mobile KVM device 20 and/or mobile KVM-enabled wireless device 22 may be used. In another example, one of mobile KVM devices 20 may be used with a single computer of any kind In another example, one of mobile KVM devices 20 may be used with a small collection of two or three or four servers, or larger server farms or data centers with any number of servers and/or other computing assets.

Figure 2:
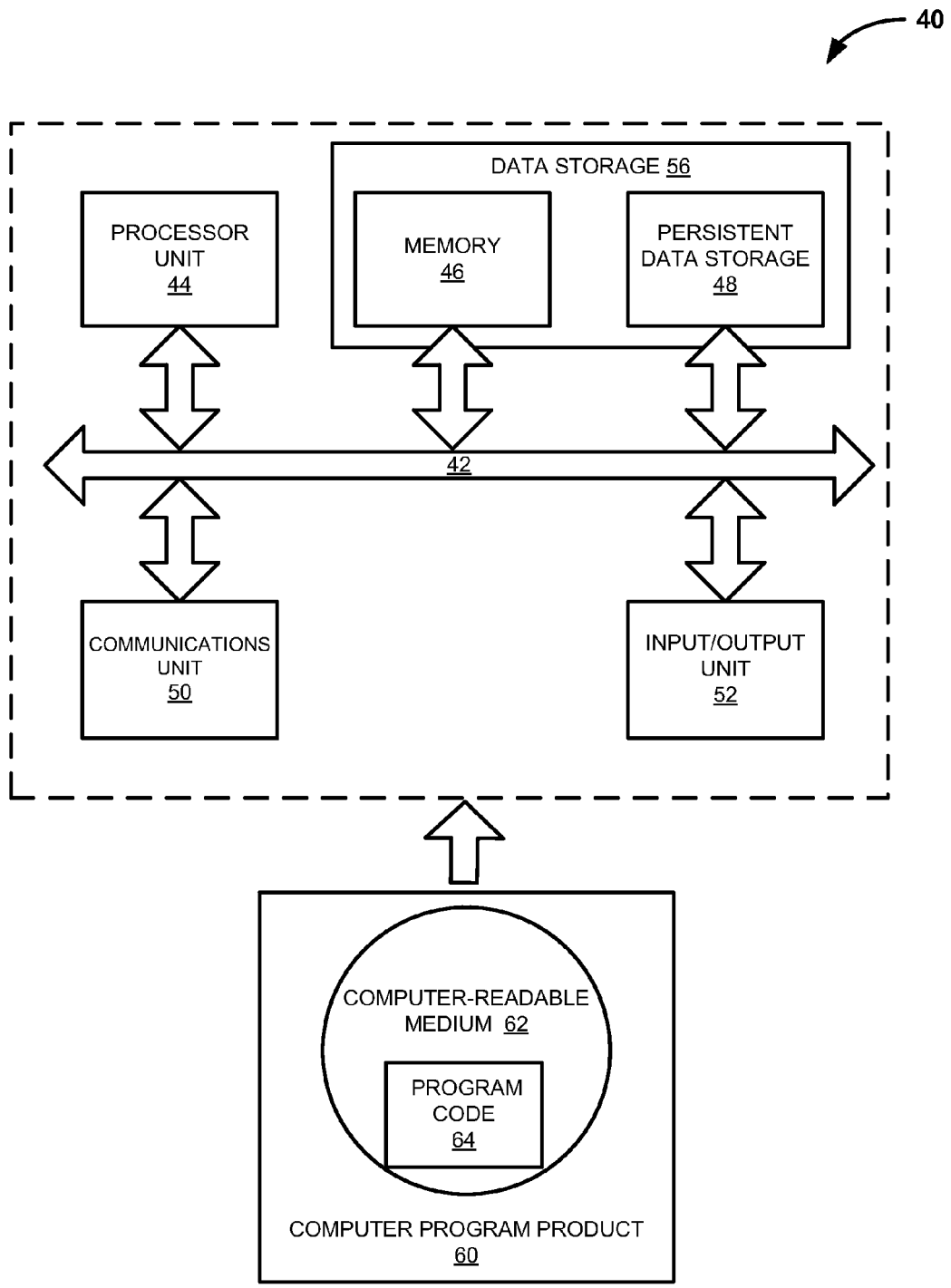
FIG. 2 is a block diagram of a computing device such as may be used in the data center of FIG. 1, according to an illustrative example.

Various features and advantages of mobile KVM devices and a mobile KVM-enabled wireless device are further described below with reference to FIGS. 3-5. FIG. 2, below, provides a computing device that is an illustrative example of each of servers 14A-14C, mobile KVM-enabled wireless device 22, each of client computing devices 32A-32C, and other computing devices.

FIG. 2 is a block diagram of a computing device such as may be used in the data center of FIG. 1, according to an illustrative example. Computing device 40 can be a workstation, server, mainframe computer, notebook or laptop computer, desktop computer, tablet, smartphone, feature phone, or other programmable data processing apparatus. Other possibilities for computing device 40 are possible, including a computer having capabilities other than those ascribed herein and possibly beyond those capabilities.

In this illustrative example, computing device 40 includes communications fabric 42, which provides communications between processor unit 44, memory 46, persistent data storage 48, communications unit 50, and input/output (I/O) unit 52. Communications fabric 42 may include a dedicated system bus, a general system bus, multiple buses arranged in hierarchical form, any other type of bus, bus network, switch fabric, or other interconnection technology. Communications fabric 42 can support transfer of data, commands, and other information between various subsystems of computing device 40.

Processor unit 44 may be a programmable central processing unit (CPU) configured for executing programmed instructions stored in memory 46. Further, processor unit 204 may be implemented using one or more heterogeneous processor systems in which a main processor is present with secondary processors on a single chip. As another illustrative example, processor unit 204 may be a symmetric multi-processor system containing multiple processors of the same type. Processor unit 44 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices®, or any other suitable processor. In various examples, processor unit 44 may comprise a multi-core processor, such as a dual core or quad core processor, for example. In various examples, processor unit 44 may comprise one or more CPUs distributed across one or more locations.

Data storage 56 includes memory 46 and persistent data storage 48, which are in communication with processor unit 44 through communications fabric 42. Memory 46 can include a random access semiconductor memory (RAM) for storing application data for processing. Memory 46 is depicted conceptually as a single monolithic entity. However, in various examples, memory 46 may be arranged in a hierarchy of caches and in other memory devices, in a single physical location, or distributed across a plurality of physical systems in various forms. While memory 46 is depicted physically separated from processor unit 44 and other elements of computing device 40, memory 46 may refer equivalently to any intermediate or cache memory at any location throughout computing device 40, such as level cache proximate to or integrated with processor unit 44 or individual cores of processor unit 44.

Persistent data storage 48 may include one or more hard disc drives, solid state drives, flash drives, rewritable optical disc drives, magnetic tape drives, or any combination of these or other data storage media. Persistent data storage 48 may store computer-executable instructions or computer-readable program code for an operating system, application files comprising program code, data structures or data files, and any other type of data. These computer-executable instructions may be loaded from persistent data storage 48 into memory 46 to be read and executed by processor unit 44 or other processors. Persistent data storage 48 and memory 46 are examples of physical, tangible computer-readable data storage devices. Data storage 56 may also include any other hardware elements capable of storing information, such as, for example and without limitation, data, program code in functional form, and/or other suitable information, either on a temporary basis and/or a permanent basis.

The operating system may provide functions such as device interface management, memory management, and multiple task management. The operating system can be a Unix based operating system such as the AIX® operating system from IBM®, a non-Unix based operating system such as the Windows® family of operating systems from Microsoft®, a network operating system such as JavaOS® from Sun Microsystems®, a mobile device operating system such as iOS® from Apple®, or any other suitable operating system. Processor unit 44 can be suitably programmed to read, load, and execute instructions of the operating system. Processor unit 44 can also be suitably programmed to read, load, and execute instructions of a mobile KVM device, such as one of mobile KVM devices 20A-20C as depicted in FIG. 1, as described in greater detail below.

Communications unit 50, in this example, provides for communications with other computing or communications systems or devices. Communications unit 50 may provide communications through the use of physical and/or wireless communications links. Communications unit 50 may include a network interface card for interfacing with a LAN (e.g., LAN 16 of FIG. 1), an Ethernet adapter, a Token Ring adapter, a modem for connecting to a transmission system such as a telephone line, a wireless communication device comprising a wireless transceiver, an infrared communication device, a wireless network interface card (NIC), or any other type of communication interface. Communications unit 50 can be used for operationally connecting many types of peripheral computing devices to computing device 40, such as printers, bus adapters, and other computers. Communications unit 50 may be implemented as an expansion card or be built into a motherboard, for example. Other programs can include server software applications in which communications unit 50 interacts with the server software application to enable computing device 40 to function as a server (e.g., one of servers 14A-14H of FIG. 1) via a LAN (e.g., LAN 16 of FIG. 1) and a network (e.g., network 30 of FIG. 1), or mobile device software applications, in different implementations.

The input/output unit 52 can support devices suited for input and output of data with other devices that may be connected to computing device 40, such as keyboard, a mouse or other pointer, a touchscreen interface, an interface for a printer or any other peripheral device, a removable magnetic or optical disc drive (including CD-ROM or DVD-ROM), a universal serial bus (USB) receptacle, or any other type of input and/or output device. Input/output unit 52 may also include a video display interface, such as a video graphics array (VGA) socket, or any other interface for video output in any type of video output protocol and any type of monitor or other video display technology, in various examples. It will be understood that some of these examples may overlap with each other, or with example components of communications unit 50 or data storage 56. Input/output unit 52 may also include appropriate device drivers for any type of external device, or such device drivers may reside elsewhere on computing device 40 as appropriate.

Input/output unit 52 may include a drive, socket, or outlet for receiving computer program product 60, which comprises a computer-readable medium 62 having computer program code 64 stored thereon. For example, computer program product 60 may be a CD-ROM, a DVD-ROM, a Blu-Ray disc, a magnetic disc, a USB stick, a flash drive, or an external hard disc drive, as illustrative examples, or any other suitable data storage technology. Computer-readable medium 62 may include any type of optical, magnetic, or other physical medium that physically encodes program code 64 as a binary series of different physical states in each unit of memory that, when read by computing device 40, induces a physical signal that is read by processor 44 that corresponds to the physical states of the storage medium 62, and that induces corresponding changes in the physical state of processor unit 44. That physical program code signal may be modeled or conceptualized as computer-readable instructions at any of various levels of abstraction, such as a high-level programming language, assembly language, or machine language, but ultimately constitutes a series of physical electrical and/or magnetic structural interactions that physically induce a change in the physical state of processor unit 44, thereby physically causing processor unit 44 to generate physical outputs in accordance with the computer-executable instructions, in a way that causes computing device 40 to physically assume new capabilities that it did not have until its physical state was changed by loading the executable instructions comprised in program code 64.

In some illustrative examples, program code 64 may be downloaded over a network to persistent storage 48 from another device or computer system for use within computing device 40. Program code 64 comprising computer-executable instructions may be communicated or transferred to computing device 40 from computer-readable medium 62 through a hard-line or wireless communications link to communications unit 50 and/or through a connection to input/output unit 52. Computer-readable medium 62 comprising program code 64 may be located at a separate or remote location from computing device 40, and may be located anywhere, including at any remote geographical location anywhere in the world, and may relay program code 64 to computing device 40 over any type of one or more communication links, such as the Internet and/or other packet data networks.

The program code 64 may be transmitted over a wireless Internet connection, or over a shorter-range direct wireless connection such as Bluetooth™, Wi-Fi™, or an infrared connection, for example. Any other wireless or remote communication protocol may also be used in other implementations. The communications link and/or the connection may include physical and/or wireless connections in various illustrative examples, and program code 64 may be transmitted from a source computer-readable medium 62 over non-tangible media, such as communications links or wireless transmissions containing the program code 64. Program code 64 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 40.

Figure 3:
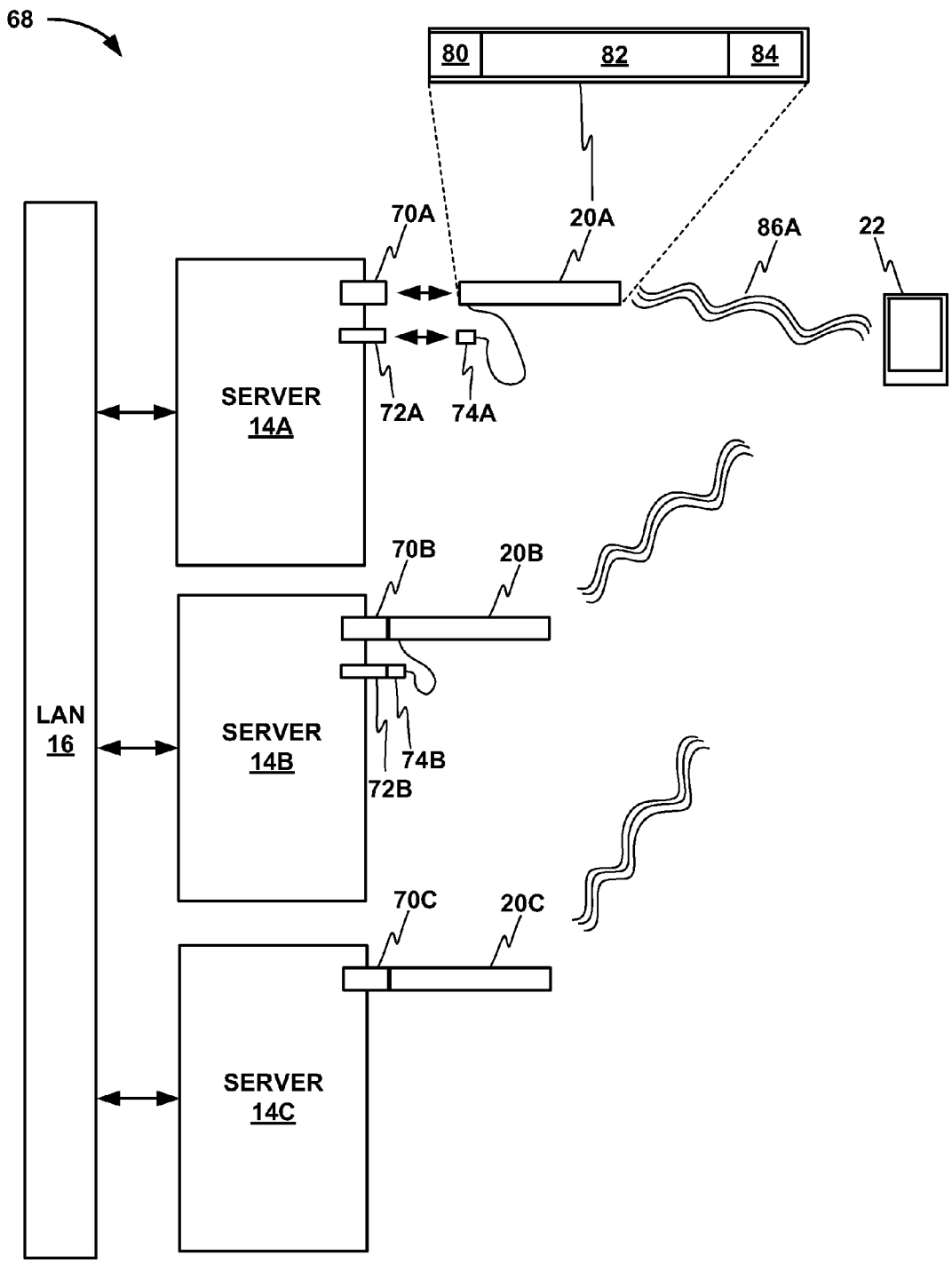
FIG. 3 is a block diagram of a system for providing wireless I/O to computing devices, according to an illustrative example.

FIG. 3 is a block diagram of a system for providing wireless I/O to computing devices, according to an illustrative example. Mobile KVM system 68 includes example mobile KVM devices 20A-20C and mobile KVM-enabled wireless device 22 interfacing with servers 14A-14C from data center 12 of FIG. 1. Servers 14A-14C are an illustrative sample of servers connected to LAN 16 in a data center such as data center 12 of FIG. 1. Mobile KVM device 20A may be plugged into port 70A, which may be a USB port, of server 14A. Mobile KVM device 20A is depicted in a larger view block diagram that shows that mobile KVM device 20A includes a wired data connector 80, a video connector 74A, a wireless I/O module 82, and a wireless communication device 84. In this illustrative example, wired data connector 80 includes a USB jack, and wireless communication device 84 includes a Bluetooth communication device with a wireless transceiver. Mobile KVM device 20A therefore includes multiple wired connectors, in the form of wired data connector 80, which may be a USB connector or other data connector, and video connector 74A. Video connector 74A may be plugged into socket 72A on server 14A. Video connector 74A may be, for example, a video graphics array (VGA) connector, an High-Definition Multimedia Interface (HDMI) connector, a Digital Visual Interface (DVI) connector, or any other kind of video output connector. Socket 72A may be, for example, a VGA socket, an HDMI socket, a DVI socket, or any other kind of video output socket.

In other examples, mobile KVM device 20A may include another type of wired connector 80 besides a USB jack or other types of KVM modules. Mobile KVM device 20 may also include another type of wireless communication device 84 besides a Bluetooth communication device, such as a Wi-Fi or infrared communication device, for example. The wireless communication device 84 may accordingly transmit and receive wireless signals according to any of a variety of wireless protocols, including Bluetooth protocol, Wi-Fi protocol, or any infrared protocol including those defined by the Infrared Data Association® or other infrared protocols. Wireless communication device 84 of mobile KVM device 20A and mobile KVM-enabled wireless device 22 exchange I/O data wirelessly through electromagnetic waves 86A, which may take the form of radio, microwave, infrared, or any appropriate electromagnetic frequencies with any appropriate modulation or coding standard or protocol in various examples. Mobile KVM device 20A may also include keyboard or mouse connectors, such as an IBM Personal System/2 (PS/2) keyboard connector or a PS/2 mouse connector, for example. Mobile KVM-enabled wireless device 22 may be a smartphone or a tablet or laptop computer that employs the same wireless connection technology as wireless communication device 84 in mobile KVM device 20A, such as Bluetooth, Wi-Fi, or infrared, for example.

Mobile KVM device 20A may establish a wireless connection with mobile KVM-enabled wireless device 22, in this example. Mobile KVM-enabled wireless device 22 is mobile KVM-enabled by having a mobile KVM app loaded on it, for example. Mobile KVM device 20A may then relay all KVM capabilities to mobile KVM-enabled wireless device 22, and mobile KVM-enabled wireless device 22 acts as a KVM console for a technician or other user to read video outputs from and provide keyboard and/or mouse inputs to server 14A using mobile KVM-enabled wireless device 22. The technician or other user may then engage in a complete KVM interface with server 14A through the mobile KVM-enabled wireless device 22, instead of having to interact directly with a KVM device physically attached to server 14A or through a KVM console that is physically connected through a hardwire connection to a KVM device physically attached to server 14A.

While KVM literally stands for "keyboard, video, mouse", the term "KVM" may also be considered more broadly to indicate any user I/O functions, regardless of the specific physical implementation. Therefore, if mobile KVM-enabled wireless device 22 is used as the wireless KVM console for connecting with mobile KVM device 20A, a user may enter mouse inputs, i.e., pointer inputs, through a touchscreen, a trackpad, or other pointer technology on mobile KVM-enabled wireless device 22 rather than using a literal mouse as a pointer device, and the touchscreen or trackpad input may be relayed to mobile KVM device 20A and from there to server 14A. Touchscreen or trackpad pointer inputs may therefore be considered equivalent to "mouse inputs", and a pointer input through a touchpad, trackpad, integrated pointer peg, or any other kind of pointer device may also be considered a "mouse input". Mobile KVM-enabled wireless device 22 may include an on-screen virtual keyboard and/or a physical keyboard, and user inputs through either the virtual or physical keyboard may be relayed via mobile KVM device 20A to server 14A as a "keyboard input". Similarly, mobile KVM-enabled wireless device 22 may be a laptop computer used as a wireless KVM console with which to interface with mobile KVM device 20A, and pointer inputs may be made through an integrated pointer device, a trackpad, a trackball, a touchscreen, a mouse, or any other pointer device, and those pointer inputs will equivalently be relayed wirelessly from the laptop to mobile KVM device 20A and from there to server 14A as "mouse inputs".

In some embodiments, mobile KVM device 20A may transmit the keyboard inputs and the mouse or pointer inputs to server 14A through wired data connector 80 and port 70A to server 14A, and also on some embodiments, server 14A may transmit video output from to mobile KVM device 20A through socket 72A and video connector 74A. This may also be the case for mobile KVM device 20B, which is plugged into port 70B (e.g., a USB port) of server 14B, while mobile KVM device 20B also comprises a video connector 74B (e.g., a VGA connector) which is plugged into socket 72B (e.g., a VGA socket). In other embodiments, video outputs may also be transmitted through a port such as a USB port, as illustrated in the example of server 14C and mobile KVM device 20C, which are connected only through a port 70C, and which exchange KVM data or user I/O data through port 70C. While VGA and USB are discussed as connections in these examples, these are also only illustrative examples, and any type of data and video connections between a server and a mobile KVM device may be used.

With mobile KVM devices 20A-20C plugged into servers 14A-14C, respectively, or with any number of additional mobile KVM devices 20 plugged into any number of servers 14, a technician or other user may then use mobile KVM-enabled wireless device 22 to alternate engaging in I/O operations with any of mobile KVM devices 20 and gain remote, wireless I/O access at will to any of servers 14, without having to physically access or physically move among any of servers 14.

In one illustrative example, internal to mobile KVM device 20A, wireless I/O module 82 may translate output signals received from server 14A through wired data connector 80 from Ethernet standard or any other type of output signal from server 14A to Internet Protocol (IP) packets or other encoding format. Wireless I/O module 82 may also translate video output signals received from server 14A via video connector 74A from VGA coding or any other applicable video standard, into IP packets or other encoding format. Wireless I/O module 82 may integrate the Ethernet standard and VGA standard data from server 14A into the same IP packets, or may encode them separately into their own interspersed IP packets. Wireless I/O module 82 then relays the IP packets that encode the user interface output of server 14A to wireless communication device 84, which encodes and sends the IP packets via wireless (e.g., Bluetooth protocol) signals, which may be received by mobile KVM-enabled wireless device 22. The mobile KVM application on mobile KVM-enabled wireless device 22 decodes the wireless IP packets received from wireless communication device 84 into graphics, commands, or any other output in accordance with the applicable KVM standards.

In this illustrative example, mobile KVM system 68 also works similarly in the reverse process. The mobile KVM application on mobile KVM-enabled wireless device 22 reads user inputs, such as keyboard inputs through a virtual or physical keyboard on mobile KVM-enabled wireless device 22 and/or mouse inputs via a mouse, touchscreen, trackpad, or other pointer device on mobile KVM-enabled wireless device 22, and encodes these user inputs into IP packets. Mobile KVM-enabled wireless device 22 transmits the IP packets via a wireless communications device (not shown) in mobile KVM-enabled wireless device 22. In one example, the wireless communications device of mobile KVM-enabled wireless device 22 includes a Bluetooth device with a wireless transceiver. In other examples, the wireless communications device of mobile KVM-enabled wireless device 22 may be a Wi-Fi or infrared communication device. Wireless communications device 84 of mobile KVM device 20A may receive the IP packets in wireless signals transmitted by mobile KVM-enabled wireless device 22. Wireless communications device 84 decodes the wireless signals and passes the IP packets to wireless I/O module 82, which decodes the IP packets into Ethernet standard data, for example, and which transmits the Ethernet standard data through USB jack 80 and USB port 70A to server 14A. While IP and Ethernet protocols are described in this example, other types of protocols and encoding formats may be used in other examples.

By this process, the user inputs, i.e. keyboard or mouse inputs, entered by the user on mobile KVM-enabled wireless device 22 are transmitted to server 14A where they may be executed by a processor unit on server 14A, stored in a data storage element of server 14A, or otherwise have their desired effect on server 14A. For example, a technician may enter an instruction on mobile KVM-enabled wireless device 22 for server 14A to shut down, and after the instruction is transmitted from mobile KVM-enabled wireless device 22 through wireless signals and mobile KVM device 20A to server 14A, server 14A may then go through a shutdown process and power off.

While the example described above discusses signals encoded in Ethernet standard, VGA standard, IP packets, and Bluetooth standard, these are all illustrative examples only, and any other coding or transmission standards or protocols may be used in other implementations within the scope of the present disclosure.

As described below with reference to FIG. 5, mobile KVM device 20A may comprise its own data storage (not depicted in FIG. 3) on which it stores executable instructions for performing the various functions disclosed above, its own processor unit (not depicted in FIG. 3) that reads and executes those executable instructions, and its own communications unit and/or input/output unit (not depicted in FIG. 3) that enable it to communicate both with its connected server or other host computing asset and with the mobile KVM-enabled wireless device. The host computing asset and the mobile KVM-enabled wireless device each constitute a computing device that may correspond to computing device 40 of FIG. 2 and may have corresponding components.

Mobile KVM system 68 thereby provides novel advantages that illustratively include locating the correct server that a technician may desire to power down. In an illustrative example, a technician may be called in to service an unfamiliar data center that may include a large number of servers connected with thick tangles of power and data cables, and in which the naming, routing, and labeling of the servers cannot be verified. In a situation such as this, establishing a KVM interface or other user interface with one or more desired servers may require verifying the hard-line data and power connections for each of the servers, which may not be possible without tracing all of the cables. This may pose a time-consuming, laborious, and risky task. Sometimes, even minor adjustments or movements of the cables can break a data or power connection, causing an unplanned outage of one or more of the servers, and causing service level agreement (SLA) violations for subscribers using data services provided by the data center, which can incur formidable expense and loss of confidence among subscribers. Trying to identify the proper target server with standard KVM devices is also prone to human error, which can also sometimes result in the wrong server being taken out of service.

Instead, using a mobile KVM system such as mobile KVM system 68 of FIG. 3, the technician may simply install a mobile KVM device into each of one or more servers, and establish a connection with those servers with the technician's mobile KVM-enabled wireless device, thereby preventing the need for tracing the cables or potentially causing a service outage among the servers. The technician may simply install a mobile KVM device into a port (e.g., a USB port) in each of the desired servers, for example. Many servers and other computing assets have USB ports in both the front and the back of the machine, which may provide for easy access for attachment of a mobile KVM device. Some servers and other computing assets have video ports (e.g., VGA ports) in both the front and the back of the machine, which may also provide for easy access for attachment of a mobile KVM device. In some examples, a USB connection may collect video output, though a VGA output may be more direct and may not require processing through a video card, so the VGA output may be able to provide a video output in some situations where video output is not available through USB. In such examples, it may be possible to gain full KVM user access through just the USB connection, though it is still desirable to provide the VGA connection as well.

A mobile KVM device may negotiate with a target computing device (e.g., a server) via a wired (e.g., USB) connector to establish a KVM or other user I/O connection between the target computing device and the user's mobile KVM-enabled wireless device. This user I/O connection may include a password or other security measure that may provide for one or more levels of security access to the target computing device. The mobile KVM device may thereby receive a security clearance from the mobile KVM-enabled wireless device, and grant an access level of the mobile KVM-enabled wireless device to the target computing device based on the security clearance.

The user I/O connection may also include multiple different user I/O access modes, such as a read only mode or a full control mode, for example, which may be based on the access level, i.e. based on which level of security access is granted. These different user I/O access modes may also be combined with the security levels, such as to enable an ordinary user security level that only provides access to the read only mode, as well as a superuser or administrator security level that enables the full control mode or that provides the option to enable either the read only mode or the full control mode, for example. The read only mode may be a mode of operation in which program instructions to send the keyboard or mouse input from the mobile KVM-enabled wireless device to the target computing device over the wired data connection between the mobile KVM device and the target computing device are not enabled, while the full control mode may be a mode of operation in which the program instructions to send the keyboard or mouse input from the mobile KVM-enabled wireless device to the target computing device over the wired data connection between the mobile KVM device and the target computing device are enabled.

The technician in this scenario may be able to identify one specific server that she wants to gain access to, and simply connect a single mobile KVM device to the desired server and then open user interface access to that server through her mobile KVM-enabled wireless device. In another example, the technician may want to access multiple servers in rapid succession, or may want to access one server but cannot initially identify which of multiple servers is the desired one to target. In this case, the technician may connect multiple mobile KVM devices to multiple servers, and then use the mobile KVM application on the mobile KVM-enabled wireless device to quickly alternate access among each of the multiple servers to which the various mobile KVM devices are connected.

In one illustrative example, a dedicated server-based mobile KVM application may be developed and installed on servers to facilitate the mobile KVM system. However, in another illustrative example, the mobile KVM devices on their own are capable of negotiating access to the server via a USB connection or other type of connection, for any of a wide variety of servers and/or other computing assets, without any specific previous access to a given server or without any specialized mobile KVM application being installed on a given server.

In one example, a technician may want to power down one particular server without knowing which of the physical servers present in a data center is the one desired to power down, and the technician may connect mobile KVM devices to each of multiple servers and use that access to identify the particular server to be powered down. Then, in one example, the technician may be able to enter a command through the mobile KVM system to that server to power down, while in another example, the technician may be able to use the mobile KVM system to identify the desired server, and then power that server down manually.

In various examples, depending on factors such as the operating system being run on the server or other target computing asset, a mobile KVM device may establish a mobile KVM connection with the server at any of a variety of levels, such as at the level of the BIOS, or at a higher operating system level. Establishing a mobile KVM connection at the BIOS level could enable the mobile KVM system to communicate video output and keyboard or mouse input from the user in response to the server starting to boot up, while establishing the mobile KVM connection at a higher OS level may only enable the KVM interface to be established after the boot-up process is further along. This may be immaterial in most use cases, but there may also be some situations in which the technician benefits from using a mobile KVM device that is able to establish user I/O access with the server at the BIOS level.

In one illustrative example, a mobile KVM device and mobile KVM application for a mobile KVM-enabled wireless device may be used with a single personal computer, rather than a server or in a data center with multiple servers. A personal computer user may acquire a mobile KVM device and plug it into her own personal computer, such as a desktop computer or home server, and load the corresponding mobile KVM application on a mobile KVM-enabled wireless device, such as a smartphone, tablet, or laptop computer. The personal computer user may then easily access and interface with her personal computer through her smartphone, for example, and use her smartphone as an ad hoc input/output device for her desktop computer from any location around the house. As with any use case of a mobile KVM system, this may be used not only for maintenance or system administration of the host machine (the desktop personal computer in this case), but for any manner of interfacing with any application or other operating aspect of the host computer to which the mobile KVM device is connected, such as email, web browsing, word processing, printing, or any other application or function of the host computer.

Figure 4:
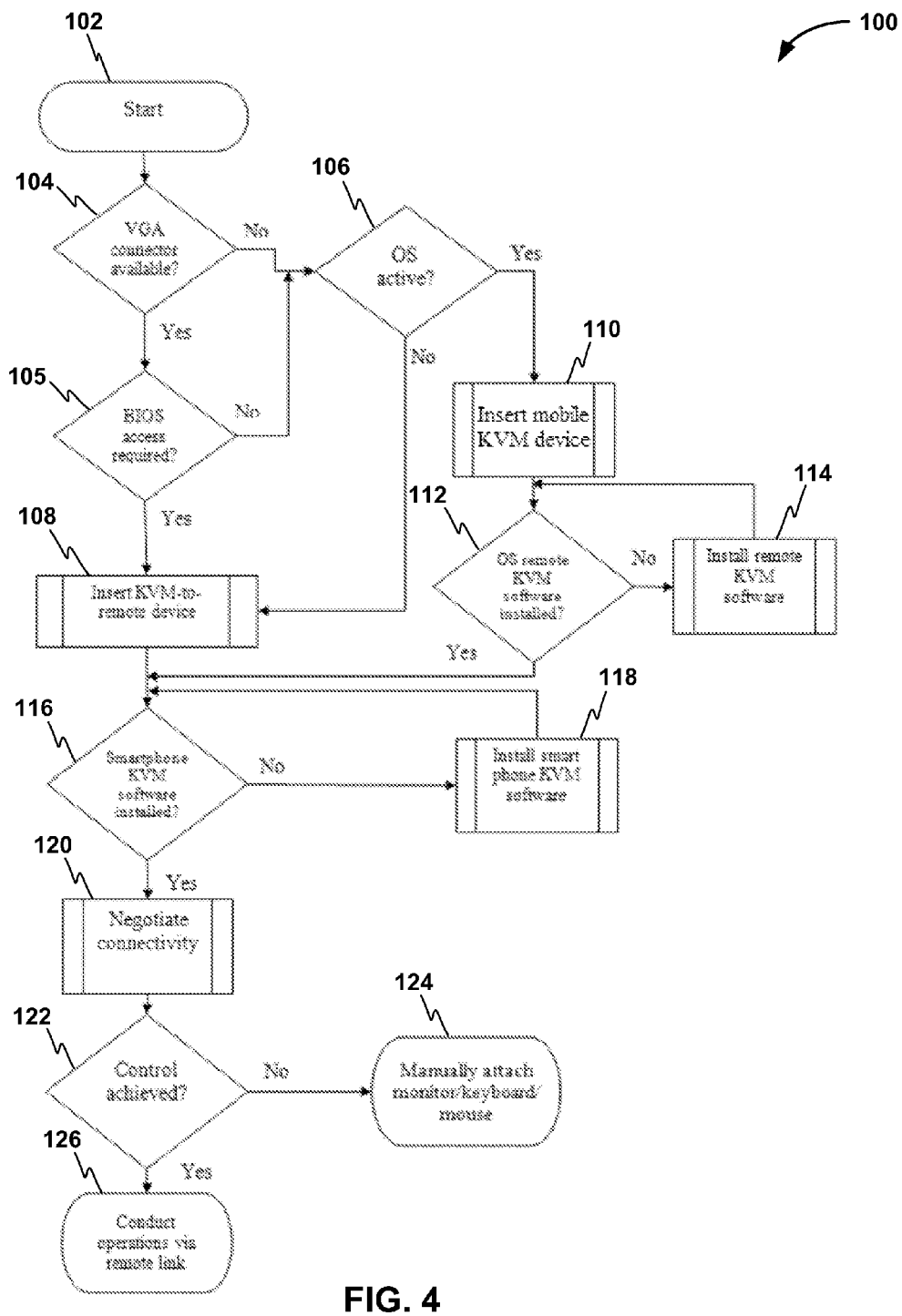
FIG. 4 is a flowchart illustrating operation of a system for providing wireless I/O to a computing device, according to an illustrative example.

FIG. 4 is a flowchart illustrating operation of a system for providing wireless I/O to a computing device, according to an illustrative example. The flowchart of FIG. 4 depicts a method 100 for making use of a mobile KVM system 68 with one or more mobile KVM devices and a mobile KVM-enabled wireless device, in this example. Method 100 begins (102) with a requirement or need for remote access to a target computing device (e.g., server 14A of FIG. 1). For example, if a data center environment is not verified and/or the potential exists for misrouting of KVM devices or mislabeling of servers, then connecting and using mobile KVM system 68 is highly advantageous.

A technician or other user may determine whether the target computing device, whether a server, workstation, appliance, etc., has a video (e.g., VGA) connector available (104) and whether BIOS access is required, whether to a system BIOS or to a host bus adapter (HBA) bios such as a SCSI BIOS or a fibre channel BIOS, for example (105). If the target computing device does not have a video connector available or if BIOS access is not required, the technician may determine if the OS (operating system) of the target computing device is active (106). If the target computing device does have a functioning hard-line KVM, the technician may connect a mobile KVM device (e.g., mobile KVM device 20A of FIGS. 1 and 3) between the hard-line KVM and its Ethernet cabling, or may connect a mobile KVM device in one or more connections or ports on the target computing device, for example (108). For example, this may include connecting a mobile KVM device to both a USB port and a VGA port, and receiving video output via the VGA connection, while communicating keyboard and/or mouse input via the USB connection.

Various examples of mobile KVM devices may be specialized for only communicating all video output and keyboard and/or mouse input via the USB port, and require interaction with the OS of the target computing device. Other examples of mobile KVM devices may be specialized for both VGA and USB connections, and communicating video output via the VGA connection while communicating keyboard and/or mouse inputs via the USB connection. Other examples of mobile KVM devices may be specialized for both VGA and PS/2 connections, for example, and communicating video output via the VGA connection while communicating keyboard and/or mouse inputs via keyboard and/or mouse PS/2 connections. These examples may be well-suited for enabling mobile KVM interaction with a BIOS of the target computing device when interaction with the OS or the video driver is not available or desired. Still other examples of mobile KVM devices may include any combination of any one or more of the above. Different embodiments of a mobile KVM device may have the capability of being installed between an existing hard-line KVM device and its Ethernet cabling, and thereby enable mobile KVM access while leaving the existing hard-line KVM connectivity in place as well. In examples in which mobile KVM devices are installed alongside existing hard-line KVM devices, a mobile KVM application of a mobile KVM-enabled wireless device may also have an integrated feature to interface with a virtual console for accessing hard-line KVM devices in an integrated interface with access to mobile KVM devices.

If no KVM device was already in place and the OS is active, the technician may insert a mobile KVM device to the target computing device, such as via a USB port, such that the mobile KVM device interfaces with the OS of the target computing device via the USB connection (110). The USB connection may negotiate with the OS to provide a software KVM connection, in this example. In particular, the mobile KVM device may interact with the OS of the target computing device and with the video driver of the target computing device to enable video output to the technician's mobile KVM-enabled wireless device. In implementations in which a mobile KVM application is used on the target computing device, the mobile KVM device may then check whether the target computing device OS already has this mobile KVM application installed (112), and if not, the mobile KVM device can go ahead and install that software on the target computing device (114), which may facilitate KVM rights and access to the target computing device in these implementations. In other examples, the mobile KVM system doesn't use additional software installed on the target computing device, and simply proceeds with establishing a KVM interface.

In some implementations, the mobile KVM device may then check, via Bluetooth or other wireless signaling, whether the technician's mobile KVM-enabled wireless device has the mobile KVM application installed and is otherwise ready to engage the mobile KVM interface (116). In these cases, if the mobile KVM device detects that the technician's mobile KVM-enabled wireless device does not yet have the proper mobile KVM application installed, it is enabled to proceed to install the mobile KVM application on the technician's mobile KVM-enabled wireless device (118). The mobile KVM device may prompt the technician for authorization to proceed with loading the software, in some examples. In other examples, the mobile KVM device detects the mobile KVM application loaded on the technician's mobile KVM-enabled wireless device and skips this stage and proceeds directly to signaling the technician's mobile KVM-enabled wireless device.

The mobile KVM device may then proceed with negotiating connectivity with the technician's mobile KVM-enabled wireless device running the mobile KVM application (120). This may include negotiating access rights, protocol, and any additional related processes required to conduct secure control of the target computing device between the mobile KVM device and the technician's mobile KVM-enabled wireless device. This may also involve technician interaction, dependent upon the security access required.

The mobile KVM device may finally confirm whether the mobile KVM system is up and running properly to establish a mobile KVM connection between the technician's mobile KVM-enabled wireless device and the target computing device (122). If the mobile KVM device is unable to establish the mobile KVM connection, including in some cases if the OS of the target computing device is not active, the mobile KVM device may indicate this on the technician's mobile KVM-enabled wireless device, and may prompt the technician to resort to manual KVM control (124). Otherwise, if the mobile KVM device successfully establishes the mobile KVM connection, it provides immediate and verified access and potentially full control over the target computing device from the technician's mobile KVM-enabled wireless device (126).

Figure 5:
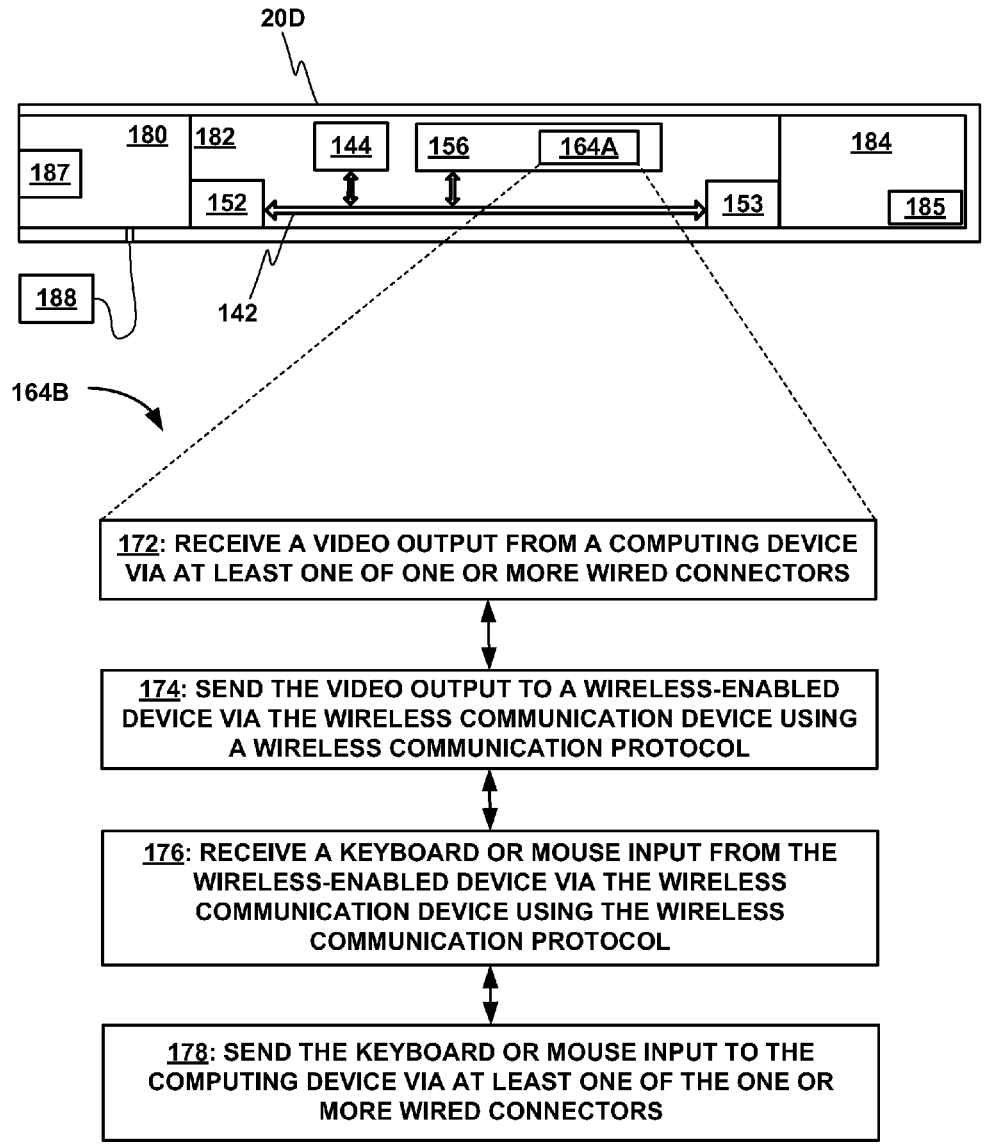
FIG. 5 is a more detailed block diagram of a wireless user I/O device implemented as a mobile KVM device with an accompanying flowchart for functions encoded in executable instructions stored on the mobile KVM device, according to an illustrative example.

FIG. 5 is a more detailed block diagram of a wireless user I/O device implemented as a mobile KVM device 20D with an accompanying flowchart for functions 164B encoded in executable instructions stored on the mobile KVM device, according to an illustrative example. Functions 164B are encoded in executable instructions stored as part of program code 164A in data storage component 156 on mobile KVM device 20D, according to an illustrative example. Mobile KVM device 20D includes wired connector component 180, wireless user I/O module 182, and wireless communication device 184. Mobile KVM device 20D may correspond to any of the examples of mobile KVM devices 20 discussed above, as well as other implementations. In this example, wired connector component 180 includes multiple wired connectors, including wired data connector 187 (such as a USB connector, for example) and a video connector 188 (such as a VGA connector, for example). Wired connector component 180 may include at least one wired connector in different examples, and may include any one or more of a Universal Serial Bus (USB) connection, a video graphics array (VGA) connection, an High-Definition Multimedia Interface (HDMI) connection, a Digital Visual Interface (DVI) connection, or any other type of wired connector. Wireless communication device 184 may include a wireless transceiver 185. Wireless transceiver 185 may be configured to transmit and receive signals using a wireless communication protocol that may include any one or more of Bluetooth, Wi-Fi, infrared, or any other protocol, modulation, or type of electromagnetic radiation or other signal medium.

Wireless user I/O module 182 includes processor 144 and data storage component 156 that exchange data with each other and with wired connector adapter 152 and wireless communication adapter 153 over communication fabric 142. Wired connector adapter 152 may include any component and/or software for communicating with or exchanging data with any wired connector of wired connector component 180, and wireless communication adapter 153 may include any component and/or software for communicating with or exchanging data with wireless communication device 184, wireless transceiver 185, or any other component of wireless communication device 184.

Processor 144 is an illustrative example of any number of one or more processors that may be included in wireless user I/O module 182, and that may include any one or more of a central processing unit (CPU), a graphics processing unit (GPU), an application-specific integrated circuit (ASIC), a field programmable gate array (FPGA), a complex programmable logic device (CPLD) or other programmable logic device (PLD), or any other kind of processing unit. Data storage component 156 may include any one or more of a flash chip, a solid state drive, a magnetic hard disc drive, an optical disc drive, a cache, a random access memory (RAM), a read-only memory (ROM), or any other type of computer-readable data storage unit or memory unit, and may include any type of tangible data storage medium in various examples. Communication fabric 142 may include any one or more buses, connectors, adapters, application-specific integrated circuits (ASICs), processors of any type, cache memory or data buffers, or any other elements that facilitate communication of data among various components of wireless user I/O module 182.

Processor 144 is configured to read and execute instructions in program code 164A stored on the data storage component 156, wherein the instructions, when executed by processor 144 and/or any other processors, perform functions including those of the depicted set of functions 164B. The set of functions 164B includes receiving a video output from a computing device, such as a server, for example, via at least one of one or more wired connectors, such as wired data connector 187, video connector 188, or any other element of wired connector component 180 (172); sending the video output to a wireless-enabled device, such as a user's mobile KVM-enabled smartphone, tablet or laptop computer, for example, via the wireless communication device 184, using a wireless communication protocol, such as Bluetooth, Wi-Fi, or an infrared protocol (174); receiving a keyboard or mouse input from the wireless-enabled device via the wireless communication device 184 using the wireless communication protocol (176); and sending the keyboard or mouse input to the computing device via at least one of the one or more wired connectors, such as wired data connector 187 or another element of wired connector component 180 (178). Mobile KVM device 20D may send the keyboard or mouse input to the computing device via a different wired connector as the one used to receive the video input; for example, mobile KVM device 20D may receive the video output from the target computing device via video connector 188 (which may be a VGA connector, for example), and send the keyboard and/or mouse input to the target computing device via wired data connector 187 (which may be a USB connector, for example).

The various functions included in the set of functions 164B may be performed in any order, and various of these functions may be performed repeatedly and/or overlapping in time as signals are received and sent. Processor 144 and/or other processors in wireless user interface module 182 may also perform additional functions, such as negotiating access rights of the wireless-enabled device to the target computing device, for example (not depicted in FIG. 5). Mobile KVM device 20D may embody or perform various methods that include functions such as those illustratively depicted among the set of functions 164B, and/or other functions.

As will be appreciated by one skilled in the art, aspects of the present invention may be embodied as a device, a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module", "device", or "system." Furthermore, aspects of the present invention may take the form of a computer program product embodied in one or more computer-readable data storage devices or computer-readable data storage components that include computer-readable medium(s) having computer readable program code embodied thereon. For example, a computer-readable data storage device may be embodied as a tangible device that may include a tangible, non-transitory data storage medium, as well as a controller configured for receiving instructions from a resource such as a central processing unit (CPU) to retrieve information stored at one or more particular addresses in the tangible, non-transitory data storage medium, and for retrieving and providing the information stored at those particular one or more addresses in the data storage medium.

The data storage device may store information that encodes both instructions and data, for example, and may retrieve and communicate information encoding instructions and/or data to other resources such as a CPU, for example. The data storage device may take the form of a main memory component such as a hard disc drive or a flash drive in various embodiments, for example. The data storage device may also take the form of another memory component such as a RAM integrated circuit or a buffer or a local cache in any of a variety of forms, in various embodiments. This may include a cache integrated with a controller, a cache integrated with a graphics processing unit (GPU), a cache integrated with a system bus, a cache integrated with a multi-chip die, a cache integrated within a CPU, or the processor registers within a CPU, as various illustrative examples. The data storage apparatus or data storage system may also take a distributed form such as a redundant array of independent discs (RAID) system or a cloud-based data storage service, and still be considered to be a data storage component or data storage system as a part of or a component of an embodiment of a system of the present disclosure, in various embodiments.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, electro-optic, heat-assisted magnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disc, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device, for example.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to radio frequency (RF) or other wireless, wireline, optical fiber cable, etc., or any suitable combination of the foregoing.

Computer program code for carrying out operations for aspects of the present invention may be written in any combination of one or more programming languages, including an object oriented programming language such as Java, Smalltalk, C++, Objective-C, or the like, or other imperative programming languages such as C, or functional languages such as Common Lisp, Haskell, or Clojure, or multi-paradigm languages such as C#, Python, Ruby, or Scala, among a variety of illustrative examples. One or more sets of applicable program code may execute entirely on the user's computer, partly on the user's computer, partly or entirely on a wireless user interface device, partly or entirely on the user's smartphone or tablet, as a stand-alone software package, partly on the user's computer and partly on a remote computer, or entirely on one or more remote computers or servers, among various examples. In the latter scenario, the remote computer may be connected to the user's computer through any type of network, including a local area network (LAN) or a wide area network (WAN), or the connection may be made to an external computer (for example, through the Internet using an Internet Service Provider).

For example, in various illustrative embodiments, various software applications, modules, or other software elements may be executed in connection with a browser or a dedicated application graphical user interface being executed on a wireless-enabled client computing device, such as a smartphone or a tablet or laptop computer, that may also interact with one or more web server applications that may be running on one or more server devices and may be executing or accessing other software applications, modules, databases, data stores, or other software elements or data structures. A browser or a dedicated application graphical user interface may be executed on a client computing device and may access web applications from the one or more web server applications, for example. Various content within the browser or dedicated application graphical user interface may be rendered or executed in or in association with the web browser using HTML, HTML5, CSS, CSS3, JavaScript, XML, AJAX, JSON, and various other languages or technologies, while other content may be provided by software applications, modules, or other elements executed on the one or more web servers and written in any programming language and/or using or accessing any software elements, data structures, or technologies, in various illustrative embodiments.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, may create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in a different order, depending upon the functionality involved. Each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The description of the present disclosure has been presented for purposes of illustration and description, and is not intended to be exhaustive or limited to the disclosure in the form disclosed. Many modifications and variations will be understood by those of ordinary skill in the art based on the concepts disclosed herein. The particular examples described were chosen and disclosed in order to explain the principles of the disclosure and example practical applications, and to enable others of ordinary skill in the art to understand the disclosure for various embodiments with various modifications as are suited to the particular use contemplated. The various examples described herein and other embodiments are within the scope of the following claims.

What is claimed is:

1. A computer program product comprising:
   one or more computer-readable tangible storage devices;
   program instructions, stored on at least one of the one or more computer-readable tangible storage devices, to receive a video output from a computing device via at least one of one or more wired connectors;
   program instructions, stored on at least one of the one or more computer-readable tangible storage devices, to send the video output to a wireless-enabled device via a wireless communication device using a wireless communication protocol;
   program instructions, stored on at least one of the one or more computer-readable tangible storage devices, to receive a keyboard or mouse input from the wireless-enabled device via the wireless communication device using the wireless communication protocol;
   program instructions, stored on at least one of the one or more computer-readable tangible storage devices, to send the keyboard or mouse input to the computing device via at least one of the one or more wired connectors;

program instructions, stored on at least one of the one or more computer-readable tangible storage devices, to receive a security clearance from the wireless-enabled device;

program instructions, stored on at least one of the one or more computer-readable tangible storage devices, to grant an access level of the wireless-enabled device to the computing device based on the security clearance; and program instructions, stored on at least one of the one or more computer-readable tangible storage devices, to provide either a read only mode or a full control mode of the wireless-enabled device to the computing device based on the access level.

2. The computer program product of claim 1, further comprising:

program instructions, stored on at least one of the one or more computer-readable tangible storage devices, to negotiate access rights of the wireless-enabled device to the computing device.

3. The computer program product of claim 1, wherein the wireless communication protocol comprises Bluetooth.

4. The computer program product of claim 1, wherein the wireless communication protocol comprises Wi-Fi.

5. The computer program product of claim 1, wherein the wireless communication protocol comprises an infrared protocol.

6. The computer program product of claim 1,
wherein the program instructions to send the keyboard or mouse input to the computing device via at least one of the one or more wired connectors are responsive to a determination that the full control mode is enabled.

7. The computer program product of claim 1, wherein one of the one or more wired connectors comprises a video connector, and wherein the program instructions to receive the video output from the computing device via at least one of the one or more wired connectors comprise program instructions to receive the video output via the video connector.

8. A device comprising:
one or more wired connectors;
a wireless communication device;
one or more processors;
one or more computer-readable tangible storage devices;
one or more computer-readable memories;
program instructions, stored on at least one of the one or more computer-readable tangible storage devices for execution by at least one of the one or more processors via at least one of the one or more computer-readable memories, to receive a video output from a computing device via at least one of the one or more wired connectors;

program instructions, stored on at least one of the one or more computer-readable tangible storage devices for execution by at least one of the one or more processors via at least one of the one or more computer-readable memories, to send the video output to a wireless-enabled device via the wireless communication device using a wireless communication protocol;

program instructions, stored on at least one of the one or more computer-readable tangible storage devices for execution by at least one of the one or more processors via at least one of the one or more computer-readable memories, to receive a keyboard or mouse input from the wireless-enabled device via the wireless communication device using the wireless communication protocol;

program instructions, stored on at least one of the one or more computer-readable tangible storage devices for execution by at least one of the one or more processors via at least one of the one or more computer-readable memories, to send the keyboard or mouse input to the computing device via at least one of the one or more wired connectors;

program instructions, stored on at least one of the one or more computer-readable tangible storage devices for execution by at least one of the one or more processors via at least one of the one or more computer-readable memories, to receive a security clearance from the wireless-enabled device;

program instructions, stored on at least one of the one or more computer-readable tangible storage devices for execution by at least one of the one or more processors via at least one of the one or more computer-readable memories, to grant an access level of the wireless-enabled device to the computing device based on the security clearance; and program instructions, stored on at least one of the one or more computer-readable tangible storage devices for execution by at least one of the one or more processors via at least one of the one or more computer-readable memories, to provide either a read only mode or a full control mode of the wireless-enabled device to the computing device based on the access level.

9. The device of claim 8, further comprising:
program instructions, stored on at least one of the one or more computer-readable tangible storage devices for execution by at least one of the one or more processors via at least one of the one or more computer-readable memories, to negotiate access rights of the wireless-enabled device to the computing device.

10. The device of claim 8, wherein one of the one or more wired connectors comprises a Universal Serial Bus (USB) connector.

11. The device of claim 8, wherein one of the one or more wired connectors comprises a video graphics array (VGA) connector.

12. The device of claim 8, wherein one of the one or more wired connectors comprises a High-Definition Multimedia Interface (HDMI) connector.

13. The device of claim 8, wherein one of the one or more wired connectors comprises a Digital Visual Interface (DVI) connector.

14. The device of claim 8, wherein one of the one or more wired connectors comprises a Personal System/2 (PS/2) keyboard connector.

15. The device of claim 8, wherein one of the one or more wired connectors comprises a Personal System/2 (PS/2) mouse connector.

16. The device of claim 8, wherein the wireless communication device comprises a wireless transceiver.

17. The device of claim 8,
wherein the program instructions to send the keyboard or mouse input to the computing device via at least one of the one or more wired connectors are responsive to a determination that the full control mode is enabled.

18. The device of claim 8 wherein one of the one or more wired connectors comprises a video connector, and wherein the program instructions to receive the video output from the computing device via at least one of the one or more wired connectors comprise program instructions to receive the video output via the video connector.

19. A method comprising:
at least one of one or more processors of a device comprising one or more wired connectors and a wireless communication device receiving a video output from a computing device via at least one of one or more wired connectors;

at least one of the one or more processors sending the video output to a wireless-enabled device via the wireless communication device using a wireless communication protocol;

at least one of the one or more processors receiving a keyboard or mouse input from the wireless-enabled device via the wireless communication device using the wireless communication protocol;

at least one of the one or more processors sending the keyboard or mouse input to the computing device via at least one of the one or more wired connectors;

at least one of the one or more processors receiving a security clearance from the wireless-enabled device;

at least one of the one or more processors granting an access level of the wireless-enabled device to the computing device based on the security clearance; and at least one of the one or more processors providing either a read only mode or a full control mode of the wireless-enabled device to the computing device based on the access level, wherein sending the keyboard or mouse input to the computing device via at least one of the one or more wired connectors is responsive to a determination that the full control mode is enabled.

20. The method of claim 19, further comprising:

at least one of the one or more processors negotiating access rights of the wireless-enabled device to the target computing device.

21. The method of claim 19, wherein the sending the keyboard or mouse input to the computing device via the wired connector comprises sending the keyboard or mouse input to a basic input/output system (BIOS) of the computing device.

22. The method of claim 19, wherein the keyboard or mouse input comprises a command to shut down the computing device.

23. The method of claim 19, wherein one of the one or more wired connectors comprises a video connector, and wherein the receiving the video output from the computing device via at least one of the one or more wired connectors comprises receiving the video output via the video connector.

* * * * *